US011640023B2

(12) United States Patent
Takagi (10) Patent No.: US 11,640,023 B2
(45) Date of Patent: May 2, 2023

(54) DISPLAY DEVICE WITH LIGHT GUIDE PLATE HAVING OUTGOING STRUCTURE REGIONS

(71) Applicant: OMRON Corporation, Kyoto (JP)

(72) Inventor: Yoshihiko Takagi, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 17/432,020

(22) PCT Filed: Feb. 6, 2020

(86) PCT No.: PCT/JP2020/004547
§ 371 (c)(1),
(2) Date: Aug. 18, 2021

(87) PCT Pub. No.: WO2020/195213
PCT Pub. Date: Oct. 1, 2020

(65) Prior Publication Data
US 2022/0120955 A1 Apr. 21, 2022

(30) Foreign Application Priority Data
Mar. 28, 2019 (JP) .............................. JP2019-064683

(51) Int. Cl.
*F21V 8/00* (2006.01)
*G09F 13/18* (2006.01)
(52) U.S. Cl.
CPC ........... *G02B 6/0036* (2013.01); *G02B 6/006* (2013.01); *G02B 6/0068* (2013.01); *G02B 6/0043* (2013.01); *G09F 13/18* (2013.01)

(58) Field of Classification Search
CPC .............. G02B 6/0036; G02B 6/0038; G02B 6/0041–0043; G02B 6/006; G09F 13/1809; G09F 13/1827
See application file for complete search history.

(56) References Cited

U.S. PATENT DOCUMENTS

2008/0316744 A1* 12/2008 Hirota ................. G02B 6/0036
362/247
2011/0241573 A1* 10/2011 Tsai ..................... G02B 6/0036
362/606
(Continued)

FOREIGN PATENT DOCUMENTS

CN          1969147 A     5/2007
CN        107924654 A     4/2018
(Continued)

OTHER PUBLICATIONS

English translation of the International Search Report ("ISR") of PCT/JP2020/004547 dated Apr. 14, 2020.
(Continued)

*Primary Examiner* — Keith G. Delahoussaye
(74) *Attorney, Agent, or Firm* — Metrolex IP Law Group, PLLC (57) ABSTRACT

A display device includes a light guide plate that guides light incident from a first light source to cause part of the light to exit from a light exit surface. The light guide plate includes a first outgoing structure region including a plurality of outgoing structures, and the plurality of first outgoing structures have maximum incident directions that make intensity of light exiting in a predetermined direction largest scattered over a first angle range.

5 Claims, 7 Drawing Sheets

(56) References Cited

U.S. PATENT DOCUMENTS

| | | |
|---|---|---|
| 2018/0003998 A1* | 1/2018 | Shinohara ................ G02B 3/08 |
| 2018/0182201 A1 | 6/2018 | Fujita et al. |
| 2019/0154903 A1* | 5/2019 | Takata .................. G02B 6/006 |
| 2019/0257996 A1 | 8/2019 | Takagi et al. |
| 2019/0383985 A1* | 12/2019 | Saeki .................. G02B 6/0068 |
| 2020/0041714 A1 | 2/2020 | Takagi |

FOREIGN PATENT DOCUMENTS

| | | |
|---|---|---|
| JP | 2005-353544 A | 12/2005 |
| JP | 2007-66880 A | 3/2007 |
| JP | 2018-151569 A | 9/2018 |
| WO | 2009/013930 A1 | 1/2009 |
| WO | 2018/092402 A1 | 5/2018 |

OTHER PUBLICATIONS

Written Opinion("WO") of PCT/JP2020/004547 dated Apr. 14, 2020.

Office Action dated Dec. 5, 2022 in a counterpart Chinese patent application.

* cited by examiner

DISPLAY DEVICE WITH LIGHT GUIDE PLATE HAVING OUTGOING STRUCTURE REGIONS

TECHNICAL FIELD

The disclosure relates to a display device that uses light to display a specific pattern.

BACKGROUND ART

Patent Document 1 discloses a display device by which a pattern displayed appears, to a viewer, like a continuously moving pattern. The display device includes a plurality of light sources and a light guide plate. The light guide plate includes a first outgoing structure region, a second outgoing structure region, and a third outgoing structure region. The first outgoing structure region includes a plurality of first outgoing structures having an incident direction that makes the intensity of light exiting in a predetermined direction largest coincident with a direction from the first light source. The second outgoing structure region includes a plurality of second outgoing structures having an incident direction that makes the intensity of light exiting in the predetermined direction largest coincident with a direction from a second light source located adjacent to the first light source. The third outgoing structure region includes a plurality of third outgoing structures having an incident direction that makes the intensity of light exiting in the predetermined direction largest coincident with a direction from a position located between the first light source and the second light source. The third outgoing structure region is located between the first outgoing structure region and the second outgoing structure region.

PRIOR ART DOCUMENT

Patent Document

Patent Document 1: Japanese Unexamined Patent Publication No. 2018-151569

SUMMARY

The display device disclosed in Patent Document 1, however, has no option regarding widths of each line constituting an image to be displayed and has only a thin line available.

Therefore, a display device according to one or more embodiments is disclosed that may have options regarding widths of each line constituting an image.

A display device according to one or more embodiments may include a plurality of light sources, and a light guide plate configured to guide light incident from each of the light sources to cause part of the light to exit from a light exit surface. The light guide plate includes a first outgoing structure region including a plurality of first outgoing structures each having a maximum incident direction that makes intensity of light exiting in a predetermined direction largest lying within a first angle range centered on a direction from a first light source, a second outgoing structure region including a plurality of second outgoing structures each having the maximum incident direction lying within a second angle range centered on a direction from a second light source located adjacent to the first light source, and a third outgoing structure region including plurality of third outgoing structures each having the maximum incident direction coincident with a direction from a position located between the first light source and the second light source. The third outgoing structure region is located between the first outgoing structure region and the second outgoing structure region, the maximum incident directions of the plurality of first outgoing structures are scattered over the first angle range, and the maximum incident directions of the plurality of second outgoing structures are scattered over the second angle range.

Further, a display device according to one or more embodiments may include a plurality of light sources, and a light guide plate configured to guide light incident from each of the light sources to cause part of the light to exit from a light exit surface. The light guide plate includes a first outgoing structure region including a plurality of first outgoing structures each having an incident direction that makes intensity of light exiting in a predetermined direction largest coincident with a direction from a first light source, a second outgoing structure region including a plurality of second outgoing structures each having an incident direction that makes intensity of light exiting in the predetermined direction largest coincident with a direction from a second light source located adjacent to the first light source, and a third outgoing structure region including a plurality of third outgoing structures each having an incident direction that makes intensity of light exiting in the predetermined direction largest coincident with a direction from a position located between the first light source and the second light source. The third outgoing structure region is located between the first outgoing structure region and the second outgoing structure region, and the plurality of first outgoing structures, the plurality of second outgoing structures, and the plurality of third outgoing structures each have a reflective surface with a curved surface.

According to one or more embodiments, it may be possible to provide a display device having options regarding widths of each line constituting an image.

DETAILED DESCRIPTION

Hereinafter, one or more embodiments will be described with reference to the drawings.

1. Application Example

Figure 2:
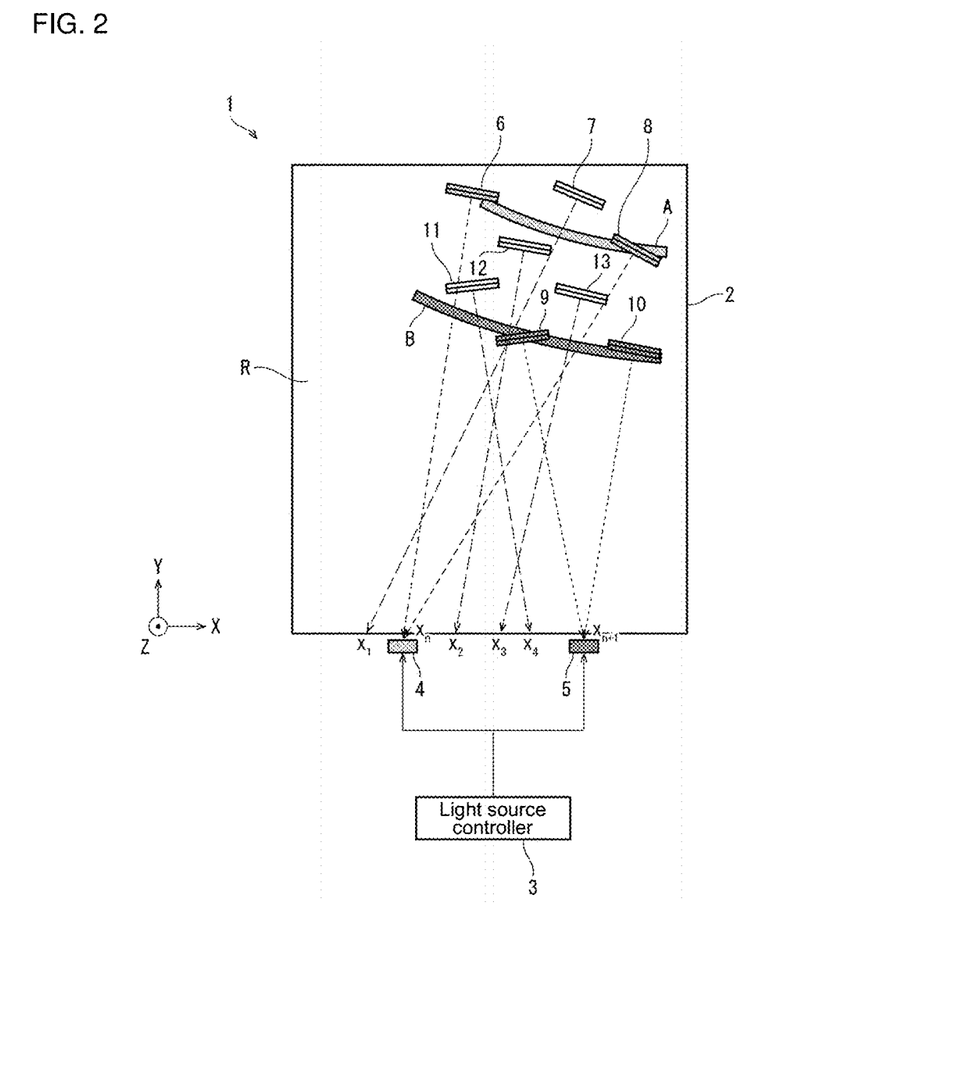
FIG. 2 is a schematic diagram schematically showing illustrating a configuration of a display device according to one or more embodiments.
Figure 3:
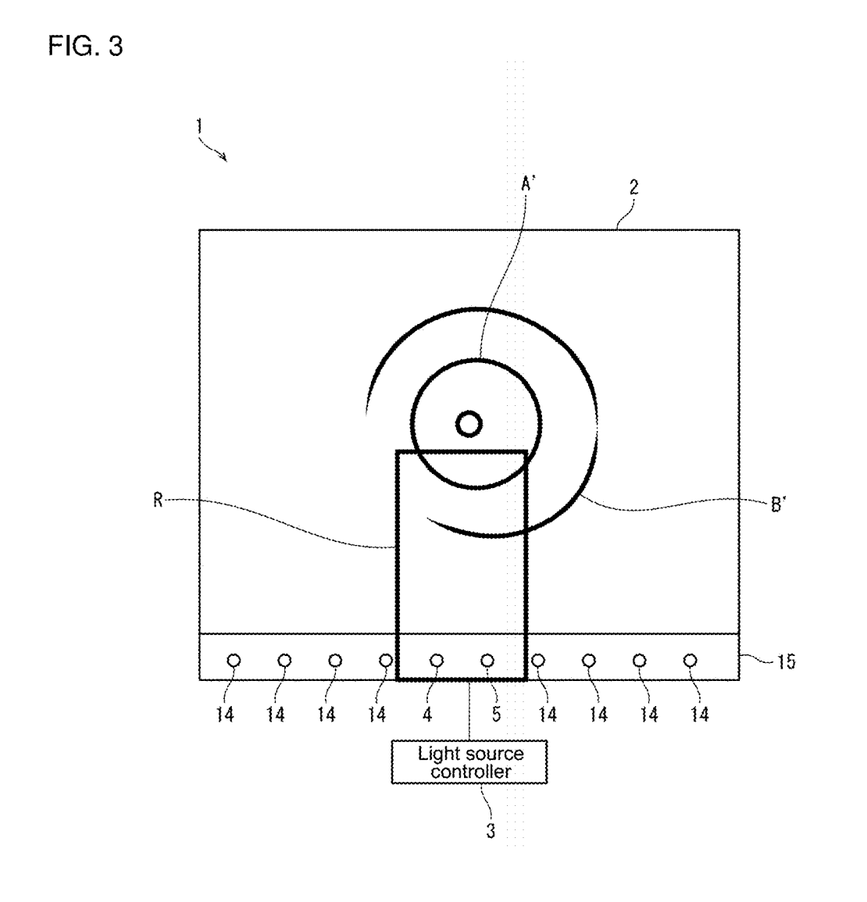
FIG. 3 is a schematic diagram illustrating an appearance of a display device according to one or more embodiments.

FIG. 2 is a diagram schematically showing a configuration of a display device 1 according to the embodiment. FIG. 3 is a diagram schematically showing an appearance of the display device 1. Note that FIG. 2 shows not a whole of a light guide plate 2 but only a part of the light guide plate 2 corresponding to a region R shown in FIG. 3.

As shown in FIG. 2, the display device 1 includes the light guide plate 2, a first light source 4 and a second light source 5 (a plurality of light sources) arranged in a line along an end surface of the light guide plate 2 parallel to the horizontal direction (X axis of FIG. 2), and a light source controller 3.

The first light source 4 and the second light source 5 belong to a light source group 15 including a plurality of light sources 14 shown in FIG. 3, and each emit light from the end surface of the light guide plate 2 toward the inside of the light guide plate 2. Examples of the first light source 4 and the second light source 5 include a light emitting diode (LED), and the like. Further, the first light source 4 and the second light source 5 may be each capable of adjusting the intensity of light to be emitted or may be capable of adjusting the color of light to be emitted. Further, a distance between the first light source 4 and the second light source 5 may be equal to or greater than 5 mm.

The light guide plate 2 is made of a light transmission casing and includes outgoing structures 6 to 13 inside the housing. The light guide plate 2 causes the outgoing structure 6 to 13 to guide light incident from each of the first light source 4 and the second light source 5 to cause part of the light to exit from a light exit surface (a surface parallel to the XY plane in the positive direction of the Z axis of FIG. 2). Examples of the outgoing structures 6 to 13 include a prism and a mirror. Details of the outgoing structures 6 to 13 will be described later.

The light source controller 3 (light intensity adjustment part, color adjustment part) turns on or off the first light source 4 and the second light source 5 so as to cause a pattern displayed on the light exit surface by the light exiting from the outgoing structures 6 to 13 to appear like a moving pattern to a viewer. Further, when the first light source 4 and the second light source 5 are capable of adjusting the intensity of light to be emitted, the light source controller 3 may be configured to adjust the intensity of light to be emitted from the first light source 4 and the intensity of light to be emitted from the second light source 5, respectively. Further, when the first light source 4 and the second light source 5 are capable of adjusting the color of light to be emitted, the light source controller 3 may be configured to adjust the color of light emitted from the first light source 4 and the color of light emitted from the second light source 5, respectively.

(Configuration of Outgoing Structure)

Figure 4:
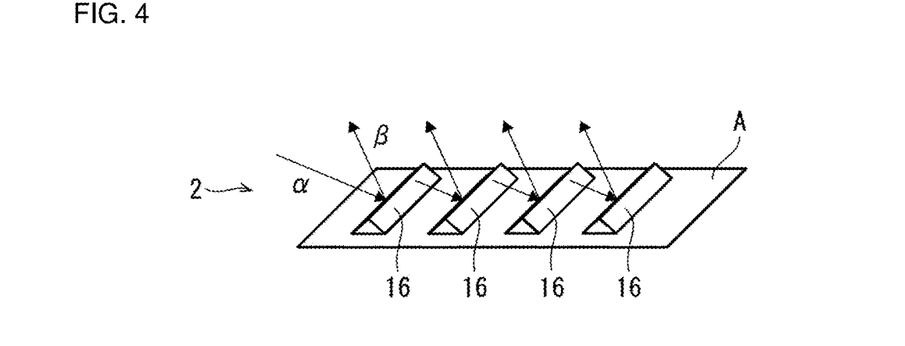
FIG. 4 is a diagram illustrating a perspective view of a plurality of outgoing structures, schematically showing a configuration of a plurality of outgoing structures.

A description will be given in detail below of the role of the outgoing structures 6 to 13 with reference to FIG. 4. FIG. 4 is a perspective view of a plurality of outgoing structures 16 (belonging to a first outgoing structure region A shown in FIG. 2) that are the same in structure as the outgoing structures 6 to 13, schematically showing a structure of the plurality of outgoing structures 16. As shown in FIG. 4, each of the plurality of outgoing structures 16 has a shape projecting toward the light exit surface of the light guide plate 2. The plurality of outgoing structures 16 are configured to make a direction of light having the largest intensity in exiting light coincident with a direction of an arrow β. This causes light incident on the plurality of outgoing structures 16 (arrow α) to change its direction so as to make the direction of light having the largest intensity in the exiting light coincident with the direction of the arrow β. This in turn causes the light having the largest intensity to exit from the plurality of outgoing structures 16 in the direction of the arrow β. The plurality of outgoing structures 16 are provided in a band shape, so that streaky light corresponding to the band shape exits from the plurality of outgoing structures 16.

A description will be given in detail below of the outgoing structures 6 to 13 shown in FIG. 2. As shown in FIG. 2, the outgoing structure 6 and the outgoing structure 8 (first outgoing structures) are arranged along the first outgoing structure region A. Further, the outgoing structure 6 and the outgoing structure 8 each have a maximum incident direction that makes the intensity of light exiting in the Z-axis positive direction (predetermined direction) of FIG. 2 largest lying within a first angle range centered on the direction from the first light source 4. In FIG. 2, a correspondence relation between the outgoing structure 6 and the first light source 4 and a correspondence relation between the outgoing structure 8 and the first light source 4 are represented by an arrow extending from the outgoing structure 6 to a position $X_n$ and an arrow extending from the outgoing structure 8 to the position $X_n$, respectively. The position $X_n$ corresponds to the position of the first light source 4. Light that exits from the outgoing structure 6 and the outgoing structure 8 belonging to the first outgoing structure region A generates a first emission region A' on the light exit surface shown in FIG. 3.

On the other hand, as shown in FIG. 2, the outgoing structure 9 and the outgoing structure 10 (second outgoing structures) are arranged along a second outgoing structure region B. Further, the outgoing structure 9 and the outgoing structure 10 each have a maximum incident direction that makes the intensity of light exiting in the Z-axis positive direction (predetermined direction) of FIG. 2 largest lying within a second angle range centered on the direction from the second light source 5. In FIG. 2, a correspondence relation between the outgoing structure 9 and the second light source 5 and a correspondence relation between the outgoing structure 10 and the second light source 5 are represented by an arrow extending from the outgoing structure 9 to a position $X_{n+1}$ and an arrow extending from the outgoing structure 10 to the position $X_{n+1}$, respectively. The position $X_{n+1}$ corresponds to the position of the second light source 5. Light that exits from the outgoing structure 9 and the outgoing structure 10 belonging to the second outgoing structure region B generates a second emission region B' on the light exit surface shown in FIG. 3.

Note that (i) the arrangement of the outgoing structures 6 and 8 belonging to the first outgoing structure region A, (ii) the arrangement of the outgoing structures 9 and 10 belonging to the second outgoing structure region B, and (iii) the intensity of light emitted from the first light source 4 and the second light source 5 are adjusted such that the first emission region A' and the second emission region B' on the light exit surface have ring patterns that are similar in shape but different in radius. This causes, when the light sources are controlled so as to make the first emission region A' and the second emission region B' sequentially visible, the pattern displayed on the light exit surface to appear, to the viewer, like a moving pattern or a pattern changing in size.

Further, as shown in FIG. 2, the outgoing structure 11, the outgoing structure 12, and the outgoing structure 13 (third outgoing structures) are arranged in a region (third outgoing structure region) located between the first outgoing structure region A and the second outgoing structure region B. Further, the outgoing structure 11, the outgoing structure 12, and the outgoing structure 13 each have a maximum incident direction that makes the intensity of light exiting in the Z-axis positive direction (predetermined direction) of FIG. 2 largest coincident with a direction from a position located between the first light source 4 and the second light source 5 (a direction of an arrow extending from the outgoing structure 11 to a position X4, a direction of an arrow extending from the outgoing structure 12 to a position X2, and a direction of an arrow extending from the outgoing structure 13 to a position X3 shown in FIG. 2).

Note that, as with the outgoing structure 11, the outgoing structure 12, and the outgoing structure 13, the outgoing structure 7 is also disposed in a region located between the first outgoing structure region A and another outgoing structure region (not shown). Further, the outgoing structure 7 has a maximum incident direction that makes the intensity of light exiting in the Z-axis positive direction (predetermined direction) of FIG. 2 largest coincident with a direction from a position located between the first light source 4 and another light source (not shown) (a direction of an arrow extending from the outgoing structure 7 to a position X1 shown in FIG. 2).

The outgoing structures 6 to 13 configured as described above cause light exiting from the outgoing structures 11 to 13 belonging to the third outgoing structure region to appear, to the viewer, as if the light fills a boundary area between the first emission region A' and the second emission region B' on the light exit surface shown in FIG. 3. For example, when control is performed such that the first light source 4 is turned on, and then the second light source 5 is turned on at the same time that the first light source 4 is turned off, it is possible to provide a display presentation in which light smoothly moves from the first emission region A' to the second emission region B'. Further, for example, even when the viewpoint of the viewer moves with the first light source 4 and the second light source 5 turned on, it is possible to provide the display presentation in which light smoothly moves from the first emission region A' to the second emission region B'.

Further, as described above, the first light source 4 and the second light source 5 are arranged in a line along one of the end surfaces of the light guide plate 2 parallel to the horizontal direction (X axis of FIG. 2). This makes it possible to provide, when, for example, the viewpoint of the viewer moves in the horizontal direction with the first light source 4 and the second light source 5 turned on, a presentation in which a pattern displayed on the light exit surface changes in state.

Further, in the display device 1 according to the embodiment, a structure where a plurality of light sources that are the same in structure as the first light source 4 and the second light source 5 and a plurality of outgoing structures that are the same in structure as the outgoing structures 6 to 13 are employed also falls within the scope of the embodiment of the present invention. Also in this structure, each light source and each outgoing structure are configured to display a specific pattern using the light exiting from each outgoing structure region, and when each light source is turned on and off so as to move the pattern, the pattern thus displayed appears, to the viewer, like a continuously moving pattern.

Further, even when the first light source 4 and the second light source 5 are capable of adjusting the intensity of light to be emitted, the light source controller 3 is configured to adjust the intensity of light to be emitted from the first light source 4 and the intensity of light to be emitted from the second light source 5, respectively, the same effect as the effect produced by the above-described third outgoing structure region can be produced. That is, since the light exiting from the third outgoing structure region fills the boundary area between the first emission region A' and the second emission region B', when the light source controller 3 performs control to gradually increase the intensity of light of the second light source 5 after gradually increasing the intensity of light of the first light source 4, it is possible to provide a display presentation in which the light more smoothly moves from the first emission region A' to the second emission region B'.

Further, even when the first light source 4 and the second light source 5 are capable of adjusting the color of light to be emitted, the light source controller 3 is configured to adjust the color of light to be emitted from the first light source 4 and the color of light to be emitted from the second light source 5, respectively, the same effect as the effect produced by the above-described third outgoing structure region can be produced. That is, since the light exiting from the third outgoing structure region fills the boundary area between the first emission region A' and the second emission region B', when the light source controller 3 performs control to gradually change the color of the first light source 4 to a specific color and then gradually change the color of the second light source 5 to the specific color, it is possible to provide a display presentation in which the color smoothly changes from the first emission region A' to the second emission region B'.

A description will be given in more detail below of the outgoing structure 11, the outgoing structure 12, and the outgoing structure 13 belonging to the third outgoing structure region. The outgoing structure 11, the outgoing structure 12, and the outgoing structure 13 each have the incident direction that makes the intensity of light exiting in the Z-axis positive direction of FIG. 2 largest coincident with a direction from a position that becomes closer to the second light source 5 away from the first light source 4 as the position where the outgoing structure 11, the outgoing structure 12, and the outgoing structure 13 are each disposed is closer to the second outgoing structure region B away from the first outgoing structure region A.

Therefore, among the outgoing structure 11, the outgoing structure 12, and the outgoing structure 13, the outgoing structure 12 disposed farthest from the second outgoing structure region B has the incident direction that makes the intensity of exiting light largest coincident with a direction from a position farthest from the second light source 5 (the direction of the arrow extending from the outgoing structure 12 to the position X2 shown in FIG. 2). Further, among the outgoing structure 11, the outgoing structure 12, and the outgoing structure 13, the outgoing structure 11 disposed closest to the second outgoing structure region B has the incident direction that makes the intensity of exiting light largest coincident with a direction from a position closest to the second light source 5 (the direction of the arrow extending from the outgoing structure 11 to the position X4 shown in FIG. 2). Then, when the first light source 4 and the second light source 5 are identical in light intensity to each other, the closer the position where the outgoing structure 11, the outgoing structure 12, and the outgoing structure 13 are each disposed to the second outgoing structure region B, the larger the intensity of exiting light.

The outgoing structure 11, the outgoing structure 12, and the outgoing structure 13 configured as described above cause the intensity of light in a third emission region on the light exit surface generated by the light exiting from the outgoing structure 11, the outgoing structure 12, and the outgoing structure 13 to continuously increase on the light exit surface from the first emission region A' to the second emission region B'. Accordingly, for example, when control is performed such that the first light source 4 is turned on, and then the second light source 5 is turned on, it is possible to provide a display presentation in which light moves more smoothly from the first emission region A' to the second emission region B'. Further, for example, even when the viewpoint of the viewer moves with the first light source 4 and the second light source 5 turned on, it is possible to provide the display presentation in which light moves more smoothly from the first emission region A' to the second emission region B'.

A description will be given in more detail below of the above-described structures of the outgoing structure 11, the outgoing structure 12, and the outgoing structure 13 belonging to the third outgoing structure region. The outgoing structure 11, the outgoing structure 12, and the outgoing structure 13 are configured such that, as the position where the outgoing structure 11, the outgoing structure 12, and the outgoing structure 13 are each disposed is closer to the second outgoing structure region B away from the first outgoing structure region A, the direction that makes the intensity of exiting light based on the light emitted by the first light source 4 largest continuously changes from the direction that makes the intensity of light exiting from the first outgoing structure region A largest to the direction that makes the intensity of light exiting from the second outgoing structure region B based on the light emitted by the first light source 4 largest.

Therefore, among the outgoing structure 11, the outgoing structure 12, and the outgoing structure 13, the outgoing structure 12 disposed farthest from the second outgoing structure region B has the direction that makes the intensity of exiting light based on the light emitted by the first light source 4 largest coincident with a direction closest to the direction that makes the intensity of light exiting from the first outgoing structure region A largest (for example, the Z-axis positive direction). Further, among the outgoing structure 11, the outgoing structure 12, and the outgoing structure 13, the outgoing structure 11 disposed closest to the second outgoing structure region B has the direction that makes the intensity of exiting light based on the light emitted by the first light source 4 largest coincident with a direction closest to the direction that makes the intensity of light exiting from the second outgoing structure region B based on the light emitted by the first light source 4 largest (for example, the Z-axis positive direction). The remaining outgoing structure 13 has the direction that makes the intensity of exiting light based on the light emitted by the first light source 4 largest coincident with a direction between the direction that makes the intensity of light exiting from the outgoing structure 11 based on the light emitted by the first light source 4 largest and the direction that makes the intensity of light exiting from the outgoing structure 12 based on the light emitted by the first light source 4 largest.

The outgoing structure 11, the outgoing structure 12, and the outgoing structure 13 configured as described above cause the third emission region on the light exit surface generated by the light exiting from the outgoing structure 11, the outgoing structure 12, and the outgoing structure 13 to fill a space between the first emission region A' and the second emission region B' with no void. Accordingly, for example, when control is performed such that the first light source 4 is turned on, and then the second light source 5 is turned on, it is possible to provide a display presentation in which light moves more smoothly from the first emission region A' to the second emission region B'. Further, for example, even when the viewpoint of the viewer moves with the first light source 4 and the second light source 5 turned on, it is possible to provide the display presentation in which light moves more smoothly from the first emission region A' to the second emission region B'.

Further, the outgoing structure 11, the outgoing structure 12, and the outgoing structure 13 each have the incident direction that makes the intensity of exiting light largest coincident with a direction from a corresponding position where the outgoing structure is installed to a position expressed by the following expression (I) in accordance with the emission intensity on the light exit surface.

$$(X_n + k*(X_{n+1} - X_n)*(1-\alpha), 0) \qquad \text{expression(I)},$$

(In the expression (I), as shown in FIG. 2, Xn denotes an X coordinate of the position where the first light source 4 is installed, and Xn+1 denotes an X coordinate of the position where the second light source 5 is installed. Further, $\alpha$ denotes emission intensity (relative value) on the light exit surface when only the first light source 4 located at the position Xn is turned on and satisfies $0 \leq \alpha \leq 1$. k denotes any coefficient greater than zero, or $f(\alpha)$, a function of $\alpha$, may be applied instead of k.)

Installing the outgoing structure 11, the outgoing structure 12, and the outgoing structure 13 in accordance with to the above-described expression (I) allows the emission intensity of the third emission region to continuously change on the light exit surface from the first emission region A' to the second emission region B'.

2. Configuration Example (First Configuration Example)

Figure 1:
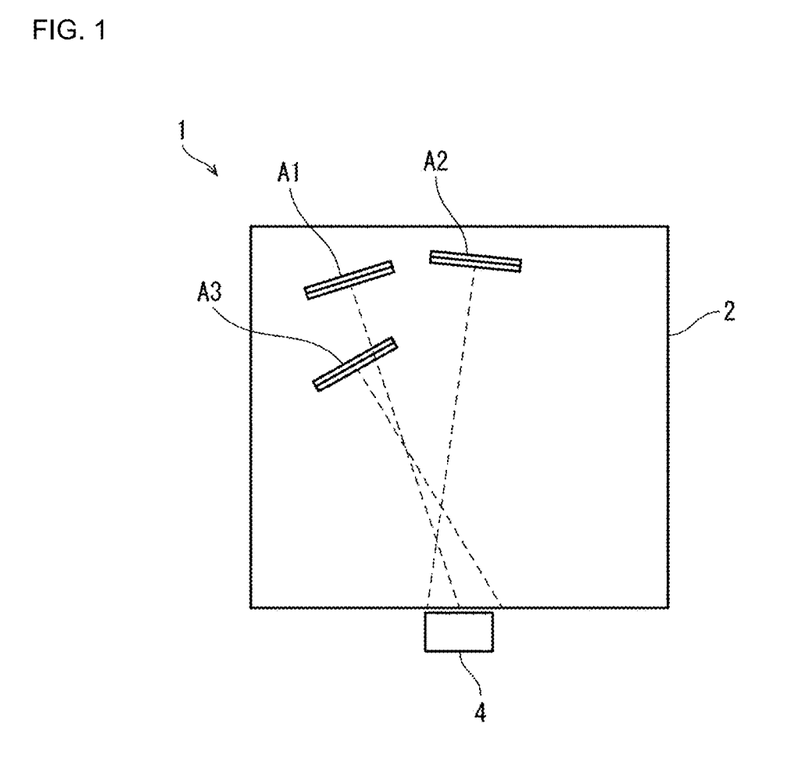
FIG. 1 is a diagram illustrating a configuration of a display device according to a first configuration example of one or more embodiments.

FIG. 1 is a diagram showing a configuration of the display device 1 according to a first configuration example of the embodiment. For the sake of simplicity, FIG. 1 shows three outgoing structures A1, A2, A3 (a plurality of first outgoing structures) belonging to the first outgoing structure region A. The outgoing structures A1 to A3 are the same in configuration as the outgoing structures 6, 8 described above.

A dashed line extending from each of the outgoing structures A1 to A3 represents a maximum incident direction that makes the intensity of light exiting in the Z-axis positive direction of FIG. 2 largest. In the example shown in FIG. 1, the maximum incident direction of the outgoing structure A1 corresponds to the direction from the first light source 4. On the other hand, the maximum incident directions of the outgoing structures A2, A3 are different from the direction from the first light source 4.

Figure 5:
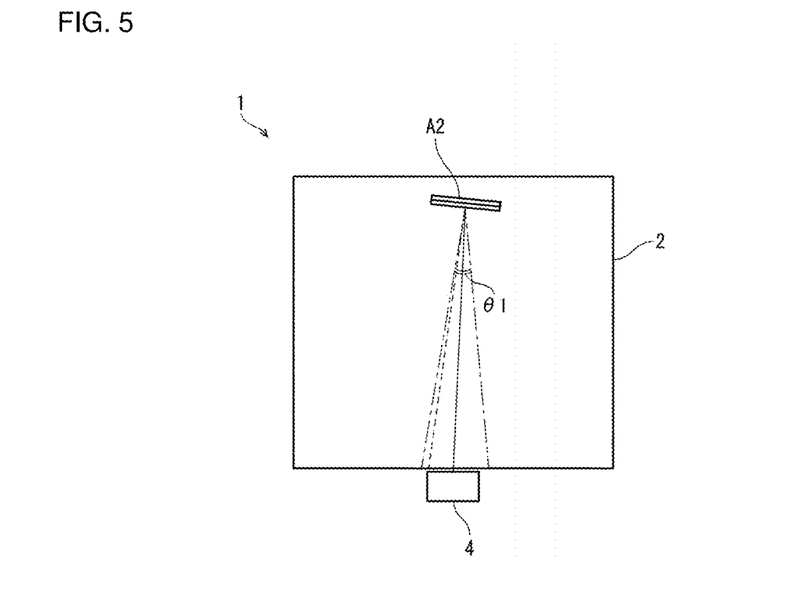
FIG. 5 is a diagram illustrating a configuration of a display device for describing a first angle range.

FIG. 5 is a diagram for describing a first angle range 81. FIG. 5 shows only the outgoing structure A2 among the outgoing structures A1 to A3 shown in FIG. 1. In FIG. 5, the direction from the first light source 4 as viewed from the outgoing structure A2 is represented by a solid line. The first angle range 81 is a predetermined angle range centered on the direction from the first light source 4 as viewed from the outgoing structure A2. The maximum incident angle of the outgoing structure A2 represented by a dashed line in FIGS. 1 and 5 falls within the first angle range 81. The specific first angle range 81 is suitably determined in accordance with a desired line width of an image displayed by the display device 1, the size of the light guide plate 2, the intervals between the plurality of light sources 14, and the like.

The maximum incident directions of the outgoing structures A1, A3 fall within the first angle range 81 centered on the direction from the first light source 4 as viewed from each of the outgoing structures A1, A3, as with the maximum incident direction of the outgoing structure A2. That is, the maximum incident direction of the first outgoing structure is scattered over the first angle range 81.

Further, the maximum incident direction of the second outgoing structure is scattered over a second angle range centered on the direction from the second light source 5. The second angle range may be identical or different in size to the first angle range 81.

Since the maximum incident direction of the first outgoing structure is scattered over the first angle range 81, the width of each line of the image formed when the first light source 4 is turned on is wider than when the maximum incident direction of the first outgoing structure is not scattered. Likewise, since the maximum incident direction of the second outgoing structure is scattered over the second angle range, the width of each line of the image formed when the second light source 5 is turned on is wider than when the maximum incident direction of the second outgoing structure is not scattered. Therefore, suitably determining the first angle range 81 and the second angle range allows the width of each line constituting the image displayed by the display device 1 to be determined as desired.

Further, in the example shown in FIG. 1, the maximum incident directions of the outgoing structures A1 to A3 are random directions. Likewise, in the example shown in FIG. 2, the maximum incident directions of the outgoing structures 6, 8, the outgoing structures 9, 10, and the outgoing structures 11 to 13 are random directions. Therefore, the image displayed by the display device 1 has a difference in light intensity for each minute region corresponding to each outgoing structure. This allows the image displayed by the display device 1 to produce a visual effect as if the image flashes for each minute region.

Figure 6:
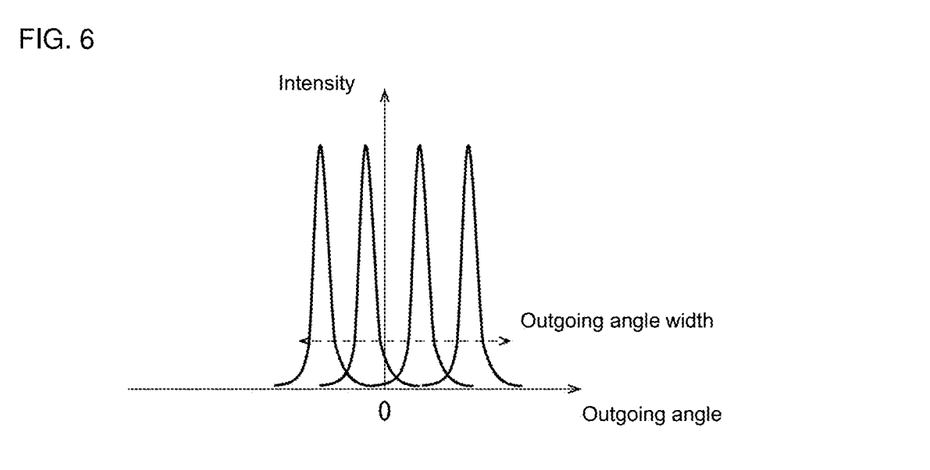
FIG. 6 is a graph illustrating intensity distribution of light, with respect to an outgoing angle, of a line displayed by a display device according to a first configuration example.

FIG. 6 is a graph showing intensity distribution of light, with respect to an outgoing angle, of a line displayed by the display device 1. In FIG. 6, the horizontal axis represents the outgoing angle, and the vertical axis represents the intensity of light. The direction that makes the outgoing angle equal to 0° corresponds to the Z-axis positive direction of FIG. 2.

As shown in FIG. 6, intensity distribution of light, with respect to the outgoing direction, of a line displayed by the outgoing structures belonging to the first outgoing structure region A is the sum of distributions having peaks corresponding to the plurality of outgoing structures. An angle width between the peaks located at both ends corresponds to an outgoing angle width of the line displayed. Therefore, in the display device 1, adjusting the number and angle of the outgoing structures belonging to the first outgoing structure region A allows the thickness of the line displayed to be determined as desired.

(Second Configuration Example)

A description will be given below of a display device 1A different from the display device 1 according to the embodiment.

Figure 7:
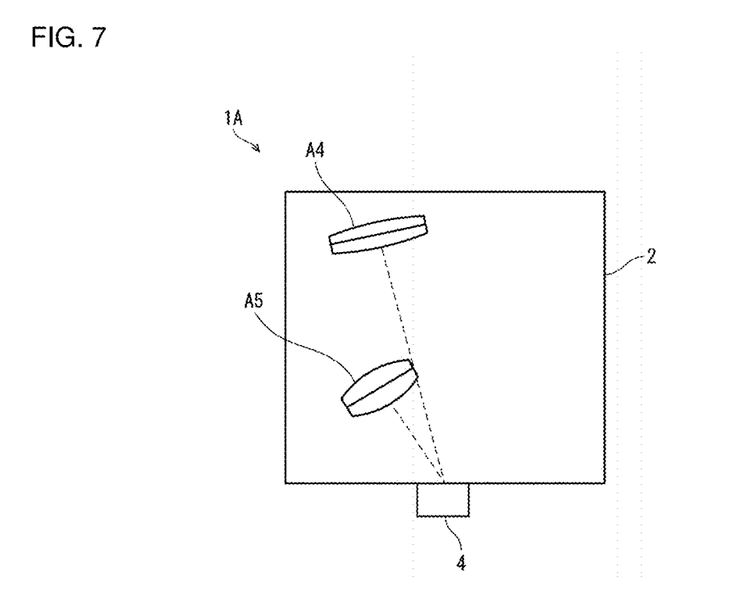
FIG. 7 is a diagram illustrating a configuration of a display device according to a second configuration example of one or more embodiments.

FIG. 7 is a diagram showing a configuration of the display device 1A according to a second configuration example of the embodiment. For the sake of simplicity, FIG. 7 shows two outgoing structures A4, A5 (a plurality of first outgoing structures) belonging to the first outgoing structure region A. The outgoing structures A4, A5 belong to the first outgoing structure region A, as with the outgoing structures 6, 8 described above.

A dashed line extending from each of the outgoing structures A4, A5 represents a maximum incident direction that makes the intensity of light exiting in the Z-axis positive direction of FIG. 2 largest. In the example shown in FIG. 7, the maximum incident direction of each of the outgoing structure A4, A5 corresponds to a direction from the first light source 4.

As shown in FIG. 7, in the display device 1A, the outgoing structures A4, A5 each have a reflective surface with a curved surface. This causes a reflection direction to change in a manner that depends on a position where light is incident on the reflective surface. Therefore, the light incident on the outgoing structure A4 or A5 from the first light source 4 is reflected over a wide range as compared with a structure where the reflective surface of each of the outgoing structures A4, A5 has no curved surface.

Further, as with the display device 1, the display device 1A includes outgoing structures 9, 10 and outgoing structures 11 to 13. In the display device 1A, the outgoing structures 9, 10 and the outgoing structures 11 to 13 each have a reflective surface with a curved surface.

Specifically, in the display device 1A, the outgoing structures A4, A5, the outgoing structures 9, 10, and the outgoing structures 11 to 13 each have a reflective surface with a curved surface. This causes each line constituting an image displayed by the outgoing structures A4, A5, the outgoing structures 9, 10, and the outgoing structures 11 to 13 to have a width determined in accordance with a shape of the curved surface of the reflective surface. Therefore, suitably setting the shape of the curved surface of the reflective surface allows the width of each line constituting the image displayed by the display device 1A to be determined as desired.

In the display device 1A, the curved surface of the reflective surface of each of the outgoing structures A4, A5, the outgoing structures 9, 10, and the outgoing structures 11 to 13 has a predetermined curvature. This predetermined curvature varies in a manner that depends on a distance from a predetermined reference position of each of the outgoing structures A4, A5, the outgoing structures 9, 10, and the outgoing structures 11 to 13. The reference position of the outgoing structures 6, 8 is, for example, the position of the first light source 4. The reference position of the outgoing structures 9, 10 is, for example, the position of the second light source 5. The reference positions of the outgoing structures 11 to 13 are, for example, any position located between the first light source 4 and the second light source 5 (for example, a position of an intermediate point).

When a curved surface of a reflective surface has a certain curvature, the larger the distance between an outgoing structure having the reflective surface and the light source, the larger the width of the line displayed by the outgoing structure. Therefore, making the curvature of the curved surface of the reflective surface variable in a manner that depends on the distance from the light source or a distance that varies in a manner that depends on the distance from the light source makes it possible to suppress variations in the width of each line constituting the image displayed by the display device 1A.

In the example shown in FIG. 7, the distance between the outgoing structure A5 and the first light source 4 is shorter than the distance between the outgoing structure A4 and the first light source 4. Therefore, the curvature of the reflective surface of the outgoing structure A5 is designed to be larger than the curvature of the reflective surface of the outgoing structure A4.

Figure 8:
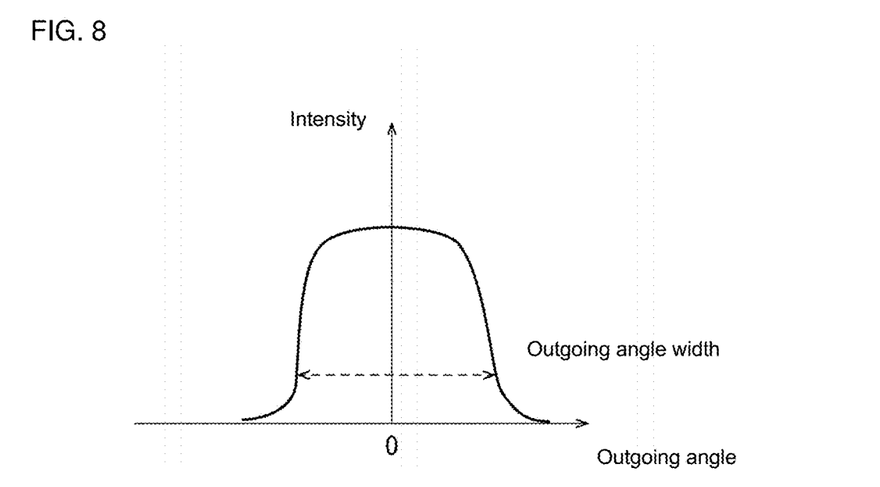
FIG. 8 is a graph illustrating intensity distribution of light, with respect to an outgoing angle, of a line displayed by a display device according to by a second configuration example.

FIG. 8 is a graph showing intensity distribution of light, with respect to an outgoing angle, of a line displayed by the display device 1A. In FIG. 8, the horizontal axis represents the outgoing angle, and the vertical axis represents the intensity of light. The direction that makes the outgoing angle equal to 0° corresponds to the Z-axis positive direction of FIG. 2.

As shown in FIG. 8, the intensity distribution of light, with respect to the outgoing direction, of the line displayed by the display device 1A has a single and wide peak corresponding to the shape of the outgoing structure. Therefore, in the display device 1A, adjusting the shape of the outgoing structure allows the width of the line displayed by the display device 1A to be determined as desired.

Further, as shown in FIG. 8, the intensity distribution of light, with respect to the outgoing angle, of the line displayed by the display device 1A has a single and wide peak. This makes it possible to display an image in which the intensity of light with respect to the outgoing angle is approximately constant on the line of the image displayed by the display device 1A.

Note that, in the display device 1A, the shape of the curved surface of the reflective surface of each outgoing structure such as the outgoing structures A4, A5 is not necessarily limited to a curved surface having the predetermined curvature, and may be designed as desired.

3. Modification

<3.1>

Figure 9:
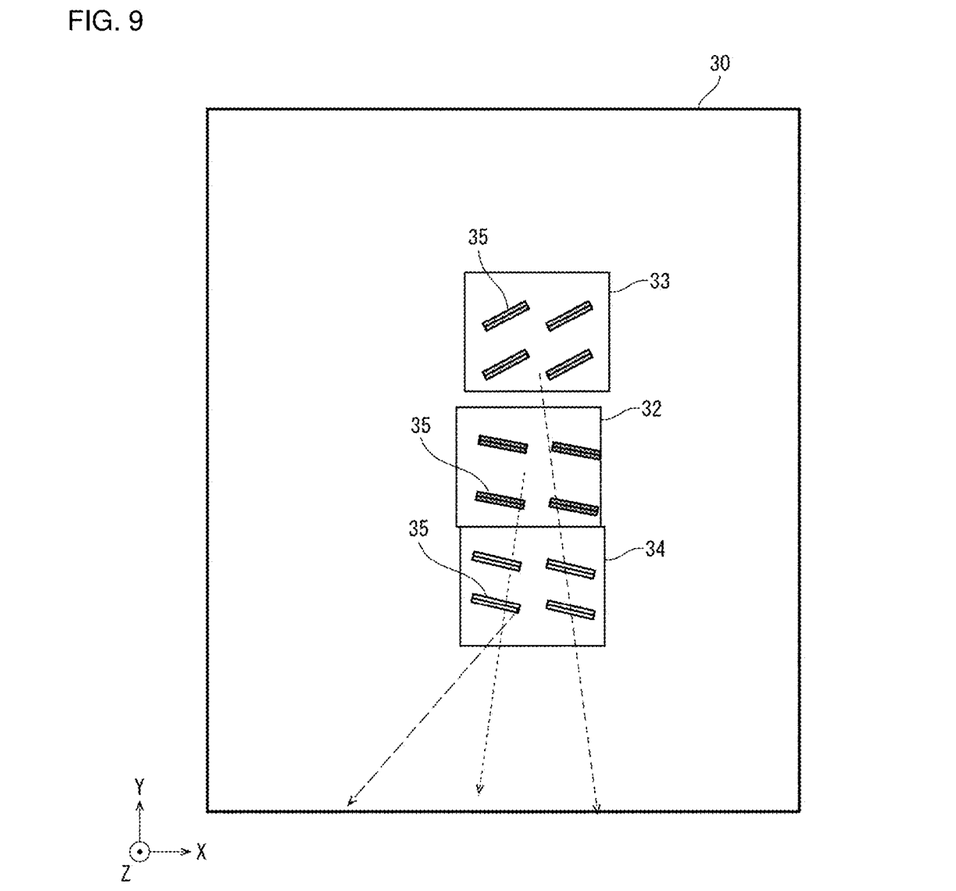
FIG. 9 is a diagram illustrating to describe a light guide plate according to a modification of a display device according to a first configuration example.

FIG. 9 is a diagram for describing a light guide plate 30 according to a modification of the display device 1. The light guide plate 30 is a modification of the light guide plate 2 included in the display device 1. As shown in FIG. 9, the light guide plate 30 includes partial regions 32, 33, 34 each including a plurality of outgoing structures 35. Each of the partial regions 32 to 34 is a region belonging to the first outgoing structure region A (see FIG. 2).

In FIG. 9, maximum incident angles of the outgoing structures 35 belonging to the partial regions 32 to 34 are represented by a dotted arrow, a dashed arrow, and a long dashed arrow, respectively. The maximum incident angles of the outgoing structures 35 belonging to the partial regions 32 to 34 are set identical to each other in each of the partial regions 32 to 34 but set at random among the partial regions 32 to 34. Likewise, the second outgoing structure region B and the third outgoing structure region have partial regions similar to the partial regions 32 to 34. That is, in the light guide plate 30, the maximum incident directions of the plurality of second outgoing structures are set identical to each other in each partial region of the second outgoing structure region B, but set at random among the plurality of partial regions. Further, the maximum incident directions of the plurality of third outgoing structures are set identical to each other in each partial region of the third outgoing structure region, but set at random among the plurality of partial regions.

In the light guide plate 30, the maximum incident direction is set at random among the partial regions. Therefore, in the image displayed by the display device 1 including the light guide plate 30, the intensity of light is approximately constant in a region of the image corresponding to each partial region, and the intensity of light differs among regions of the image corresponding to the partial regions. This allows the image displayed by the display device 1 to produce a visual effect as if the image flashes for each region larger than the minute region.

Figure 10A:
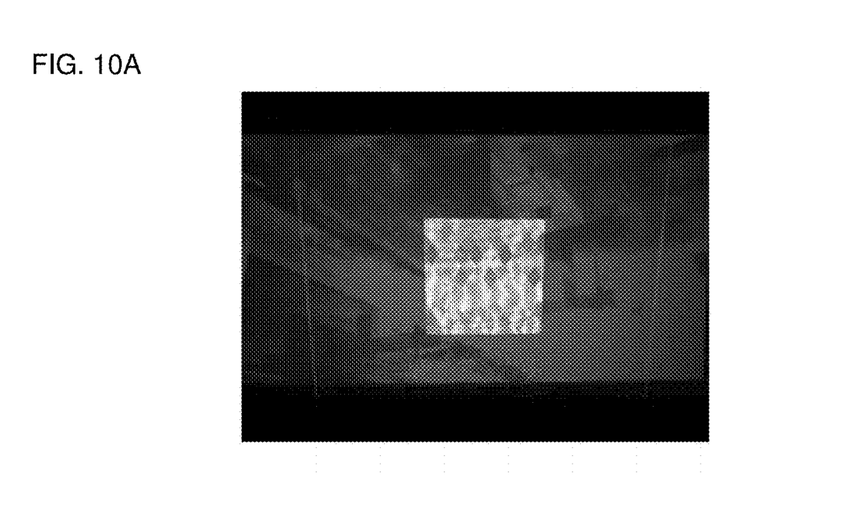
FIG. 10A is a diagram illustrating a pattern called "diamond"
Figure 10B:
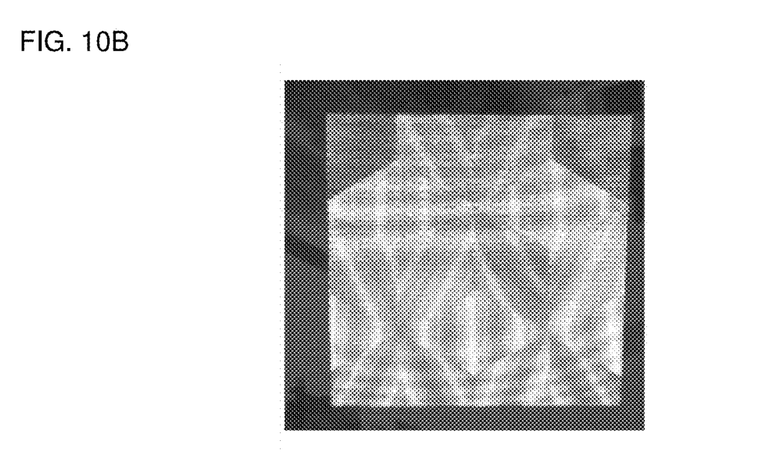
FIG. 10B is a diagram showing a pattern called "cube"
Figure 10C:
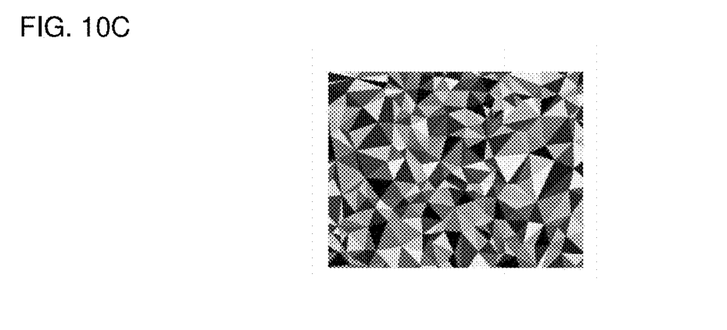
FIG. 10C is a diagram showing a pattern called "ice crash".

FIG. 10A is a diagram showing a pattern generally called "diamond". FIG. 10B is a diagram showing a pattern generally called "cube". FIG. 10C is a diagram showing a pattern generally called "ice crash".

The patterns shown in FIG. 10A, FIG. 10B, and FIG. 10C, are each formed of a combination of a large number of minute designs. The display device 1 including the light guide plate 30 is capable of producing a visual effect as if the pattern flashes for each minute design.

<3.2>

A description will be given below of a modification of the display device 1A.

For the display device 1A, in the above-described example, the curvature of the curved surface of the reflective surface of each of the outgoing structures 6, 8, the outgoing structures 9, 10, and the outgoing structures 11 to 13 varies in a manner that depends on the distance from the predetermined reference position of a corresponding one of the outgoing structures 6, 8, the outgoing structures 9, 10, and the outgoing structures 11 to 13. When a configuration where the curvature continuously varies in a manner that depends on the distance from the reference position is employed, more time and effort is required to manufacture the light guide plate 2. It is therefore conceivable to divide the first outgoing structure region A, the second outgoing structure region B, and the third outgoing structure region into a plurality of partial regions in accordance with the distance from the reference position so as to make the curvature different for each partial region.

The configuration where the curvatures are made uniformly different among the partial regions, however, causes a difference in width of lines of the image displayed by the display device 1A due to the difference in curvature to be visually recognized by the user.

Therefore, according to the modification, the predetermined curvatures applied to the first outgoing structures are identical to each other in each partial region that results from dividing the first outgoing structure region A in accordance with the distance from the first light source 4. Further, the predetermined curvatures applied to the plurality of second outgoing structures are identical to each other in each partial region that results from dividing the second outgoing structure region B in accordance with the distance from the second light source 5. Likewise, the predetermined curvatures applied to the plurality of third outgoing structures are identical to each other in each partial region that results from dividing the third outgoing structure region in accordance with the distance from the first light source 4 or the second light source 5. Furthermore, outgoing structures each having a reflective surface with a curvature applied to an adjacent partial region are randomly arranged near a boundary between the plurality of the partial regions. Specifically, outgoing structures having two different curvatures are randomly arranged near the boundary between the partial regions. This makes variations in width of each line of the image displayed by the display device 1A due to the variations in curvature inconspicuous for the user.

The present invention is not limited to any of the above-described embodiments, and various modifications may be made within the scope of the claims, and embodiments obtained by suitably combining technical means disclosed in different embodiments also fall within the technical scope of the present invention.

SUMMARY

As described above, a display device according to an aspect of the present invention includes a plurality of light sources, and a light guide plate configured to guide light incident from each of the light sources to cause part of the light to exit from a light exit surface. The light guide plate includes a first outgoing structure region including a plurality of first outgoing structures each having a maximum incident direction that makes intensity of light exiting in a predetermined direction largest lying within a first angle range centered on a direction from a first light source, a second outgoing structure region including a plurality of second outgoing structures each having the maximum incident direction lying within a second angle range centered on a direction from a second light source located adjacent to the first light source, and a third outgoing structure region including a plurality of third outgoing structures each having the maximum incident direction coincident with a direction from a position located between the first light source and the second light source. The third outgoing structure region is located between the first outgoing structure region and the second outgoing structure region, the maximum incident directions of the plurality of first outgoing structures are scattered over the first angle range, and the maximum incident directions of the plurality of second outgoing structures are scattered over the second angle range.

The above-described configuration causes light exiting from the plurality of third outgoing structures belonging to the third outgoing structure region to appear, to a viewer, as if the light fills a boundary area between a first emission region generated by the light exiting from the first outgoing structure region and a second emission region generated by the light exiting from the second outgoing structure region on the light exit surface. Specifically, for example, when control is performed such that the first light source is turned on, and then the second light source is turned on, it is possible to provide a display presentation in which light moves smoothly from the first emission region to the second emission region. Further, for example, even when the viewpoint of the viewer moves with the first light source and the second light source turned on, it is possible to provide the display presentation in which light moves smoothly from the first emission region to the second emission region.

At this time, light displayed by the plurality of first outgoing structures when the first light source is turned on has a width corresponding to the first angle range. Likewise, light displayed by the plurality of second outgoing structures when the second light source is turned on has a width corresponding to the second angle range. Therefore, suitably setting the first angle range and the second angle range allows the width of each line constituting the image displayed by the display device to be determined as desired.

Further, in the display device according to the aspect of the present invention, the maximum incident direction of each of the plurality of first outgoing structures, the maximum incident direction of each of the plurality of second outgoing structures, and the maximum incident direction of each of the plurality of third outgoing structures may be random directions.

The above-described configuration makes the maximum incident directions of the first outgoing structures, second outgoing structures, and third outgoing structures random. This makes the intensity of light reaching the viewpoint of the viewer uneven for each minute region of the image corresponding to such outgoing structures so as to produce a visual effect as if the image flashes for each minute region.

Further, in the display device according the aspect of the present invention, the maximum incident directions of the plurality of first outgoing structures may be set identical to each other within a partial region of the first outgoing structure region and set at random among a plurality of the partial regions, the maximum incident directions of the plurality of second outgoing structures may be set identical to each other within a partial region of the second outgoing structure region and set at random among a plurality of the partial regions, and the maximum incident directions of the plurality of third outgoing structures may be set identical to each other within a partial region of the third outgoing structure region and set at random among a plurality of the partial regions.

The above-described configuration has the maximum incident directions set at random among the partial regions of the first outgoing structure region, the partial regions of the second outgoing structure region, and the partial regions of the third outgoing structure region. This allows the image displayed by the display device to produce a visual effect as if the image flashes for each region corresponding to outgoing structures belonging to the partial regions.

Further, a display device according to an aspect of the present invention includes a plurality of light sources, and a light guide plate configured to guide light incident from each of the light sources to cause part of the light to exit from a light exit surface. The light guide plate includes a first outgoing structure region including a plurality of first outgoing structures each having an incident direction that makes intensity of light exiting in a predetermined direction largest coincident with a direction from a first light source, a second outgoing structure region including a plurality of second outgoing structures each having an incident direction that makes intensity of light exiting in the predetermined direction largest coincident with a direction from a second light source located adjacent to the first light source, and a third outgoing structure region including a plurality of third outgoing structures each having an incident direction that makes intensity of light exiting in the predetermined direction largest coincident with a direction from a position located between the first light source and the second light source. The third outgoing structure region is located between the first outgoing structure region and the second outgoing structure region, and the plurality of first outgoing structures, the plurality of second outgoing structures, and the plurality of third outgoing structures each have a reflective surface with a curved surface.

The above-described configuration causes light exiting from the plurality of third outgoing structures belonging to the third outgoing structure region to appear, to a viewer, as if the light fills a boundary area between a first emission region generated by the light exiting from the first outgoing structure region and a second emission region generated by the light exiting from the second outgoing structure region on the light exit surface. Specifically, for example, when control is performed such that the first light source is turned on, and then the second light source is turned on, it is possible to provide a display presentation in which light moves smoothly from the first emission region to the second emission region. Further, for example, even when the viewpoint of the viewer moves with the first light source and the second light source turned on, it is possible to provide the display presentation in which light moves smoothly from the first emission region to the second emission region.

Since the plurality of first outgoing structures, the plurality of second outgoing structures, and the plurality of third outgoing structures each have the reflective surface with the curved surface, a reflection direction varies in a manner that depends on a position where the light is incident on the reflective surface. This causes each line constituting the image displayed by the first outgoing structures, the second outgoing structures, and the third outgoing structures to have a width determined in accordance with to a shape of the curved surface of the reflective surface. Therefore, suitably setting the shape of the curved surface of each reflective surface of the first outgoing structures, the second outgoing structures, and the third outgoing structures allows the width of each line constituting the image displayed by the display device to be determined as desired.

Further, in the display device according to the aspect of the present invention, the curved surface has a predetermined curvature, and the predetermined curvature varies in a manner that depends on a distance from a predetermined reference position of each of the plurality of first outgoing structures, the plurality of second outgoing structures, and the plurality of third outgoing structures.

The above-described configuration makes it possible to suppress variations in width of each line constituting the image displayed by the display device in a manner that depends on the distance from the predetermined reference position to the first outgoing structure, the second outgoing structure, or the third outgoing structure.

Further, in the display device according the aspect of the present invention, the predetermined curvatures applied to the plurality of first outgoing structures are identical to each other within a partial region of the first outgoing structure region, the partial region being defined in accordance with a distance from the first light source, the predetermined curvatures applied to the plurality of second outgoing structures are identical to each other within a partial region of the second outgoing structure region, the partial region being defined in accordance with a distance from the second light source, the predetermined curvatures applied to the plurality of third outgoing structures are identical to each other within a partial region of the third outgoing structure region, the partial region being defined in accordance with a distance from the first light source or the second light source, and outgoing structures each having a reflective surface with a curvature applied to an adjacent partial region are randomly arranged near a boundary between a plurality of the partial regions.

When the curvatures of the reflective surfaces of the first outgoing structures, the second outgoing structures, or the third outgoing structures are made variable for each partial region in a manner that depends on the distance from the first light source or the second light source, the above-described configuration makes variations in width of each line of the image due to the variations in curvature inconspicuous for the user.

DESCRIPTION OF SYMBOLS 1, 1A display device
2, 30 light guide plate
first light source
second light source
6, 8, A1, A2, A3, A4, A5 outgoing structure (first outgoing structure)
9, 10 outgoing structure (second outgoing structure)
11, 12, 13 outgoing structure (third outgoing structure)
light source
A first outgoing structure region
B second outgoing structure region
The invention claimed is:

1. A display device comprising:
a plurality of light sources; and
a light guide plate configured to guide light incident from each of the light sources to cause part of the light to exit from a light exit surface, wherein
the light guide plate comprises
a first outgoing structure region comprising a plurality of first outgoing structures each having a maximum incident direction that causes an intensity of light exiting in a first predetermined direction to be largest for the first predetermined direction lying within a first angle range centered on a first direction of light emission from a first light source,
a second outgoing structure region comprising a plurality of second outgoing structures each having the maximum incident direction lying within a second angle range centered on a second direction of light emission from a second light source located adjacent to the first light source, and
a third outgoing structure region comprising a plurality of third outgoing structures each having the maximum incident direction coincident with a third direction of light from a position located between the first light source and the second light source, wherein
the third outgoing structure region is located between the first outgoing structure region and the second outgoing structure region,
the maximum incident directions of the plurality of first outgoing structures are scattered over the first angle range, and
the maximum incident directions of the plurality of second outgoing structures are scattered over the second angle range.

2. The display device according to claim 1, wherein the maximum incident direction of each of the plurality of first outgoing structures, the maximum incident direction of each of the plurality of second outgoing structures, and the maximum incident direction of each of the plurality of third outgoing structures are random directions.

3. The display device according to claim 1, wherein the maximum incident directions of the plurality of first outgoing structures are set identical to each other within a partial region of the first outgoing structure region and set at random among a plurality of the partial regions,
the maximum incident directions of the plurality of second outgoing structures are set identical to each other within a partial region of the second outgoing structure region and set at random among a plurality of the partial regions, and
the maximum incident directions of the plurality of third outgoing structures are set identical to each other within a partial region of the third outgoing structure region and set at random among a plurality of the partial regions.

4. A display device comprising:
a plurality of light sources; and
a light guide plate configured to guide light incident from each of the light sources to cause part of the light to exit from a light exit surface, wherein
the light guide plate comprises a first outgoing structure region comprising a plurality of first outgoing structures each having an incident direction that causes an intensity of light exiting in a first predetermined direction to be largest for the first predetermined direction coincident with a first direction of light emission from a first light source, a second outgoing structure region comprising a plurality of second outgoing structures each having an incident direction that causes an intensity of light exiting in a second predetermined direction to be largest for the second predetermined direction coincident with a second direction of light emission from a second light source located adjacent to the first light source, and a third outgoing structure region comprising a plurality of third outgoing structures each having an incident direction that causes an intensity of light exiting in a third predetermined direction to be largest for the third predetermined direction coincident with a third direction of light from a position located between the first light source and the second light source, wherein the third outgoing structure region is located between the first outgoing structure region and the second outgoing structure region, the plurality of first outgoing structures, the plurality of second outgoing structures, and the plurality of third outgoing structures each have a reflective surface with a curved surface, the curved surface has a predetermined curvature, and the predetermined curvature varies in accordance with a distance from a predetermined reference position of each of the plurality of first outgoing structures, the plurality of second outgoing structures, and the plurality of third outgoing structures.

5. The display device according to claim 4, wherein the predetermined curvatures applied to the plurality of first outgoing structures are identical to each other within a partial region of the first outgoing structure region, the partial region being defined in accordance with a distance from the first light source, the predetermined curvatures applied to the plurality of second outgoing structures are identical to each other within a partial region of the second outgoing structure region, the partial region being defined in accordance with a distance from the second light source, the predetermined curvatures applied to the plurality of third outgoing structures are identical to each other within a partial region of the third outgoing structure region, the partial region being defined in accordance with a distance from the first light source or the second light source, and outgoing structures each having a reflective surface with a curvature applied to an adjacent partial region are randomly arranged near a boundary between a plurality of the partial regions.

* * * * *